(12) United States Patent
Lebee et al.

(10) Patent No.: US 6,928,378 B2
(45) Date of Patent: Aug. 9, 2005

(54) STRESS TESTING AT LOW COST THROUGH PARALLEL EXECUTION OF UNIT TESTS

(75) Inventors: Pierre Lebee, Crepy-en-Valois (FR); Ivan Boule, Paris (FR); Sebastien Laborie, Paris (FR); Aurelien Jacquiot, Paris (FR)

(73) Assignee: Sun Microsystems, Inc., Santa Clara, CA (US)

( * ) Notice: Subject to any disclaimer, the term of this patent is extended or adjusted under 35 U.S.C. 154(b) by 19 days.

(21) Appl. No.: 10/626,120

(22) Filed: Jul. 23, 2003

(65) Prior Publication Data

US 2004/0138847 A1 Jul. 15, 2004

(30) Foreign Application Priority Data

Jul. 23, 2002 (FR) .............................. 02 09344

(51) Int. Cl.[7] .............................. G06F 19/00; G06F 9/44
(52) U.S. Cl. ........................ 702/123; 702/182; 714/38; 717/124
(58) Field of Search .............................. 702/108, 123, 702/182–186; 714/38, 47; 717/124

(56) References Cited

U.S. PATENT DOCUMENTS

| 6,324,492 | B1 | * | 11/2001 | Rowe ........................... 703/13 |
| 2003/0167422 | A1 | * | 9/2003 | Morrison et al. ............. 714/38 |
| 2004/0015744 | A1 | * | 1/2004 | Klotz et al. .................... 714/43 |

FOREIGN PATENT DOCUMENTS

WO    WO0075783 A1 * 12/2000    ......... G06F/11/263

* cited by examiner

*Primary Examiner*—Marc S. Hoff
*Assistant Examiner*—Manuel L. Barbee
(74) *Attorney, Agent, or Firm*—Hickman Palermo Truong & Becker, LLP.

(57) ABSTRACT

Methods and systems of testing an operating system are described. The operating system is invoked to create a process, the process having a first thread. A test function is repetitively executed in a first thread of the process. These steps are repeated to create processes and to execute the test function in parallel and repetitively in the first thread of the created processes until a given condition is satisfied. For example, the given condition can be a condition in which the operating system resources are exhausted.

30 Claims, 6 Drawing Sheets

STRESS TESTING AT LOW COST THROUGH PARALLEL EXECUTION OF UNIT TESTS

RELATED APPLICATION

This Application claims priority to the French Patent Application, Number 0209344, filed on Jul. 23, 2002, in the name of Sun Microsystems, Inc., which application is hereby incorporated by reference.

BACKGROUND OF THE INVENTION

1. Field of the Invention

Embodiments of the present invention generally relate to computer software technology. More specifically, embodiments of the present invention relate to execution of tests on operating systems.

2. Related Art

Robust operating systems are tested to detect problems in execution on the operating systems or to improve the configuration of the operating systems, for example.

Operating systems are nowadays tested with validation tests executed sequentially. However, sequential execution does not permit an operating system to be tested in exceptional conditions, e.g., in conditions that stress the operating system. Thus, the limits of an operating system can only be determined partially and inefficiently.

Massive parallel execution of unit tests enables simulation of an overhead of test executions. However, massive parallel execution of unit tests consumes both time and resources, and/or necessitates the design of a dedicated framework enabling such parallel executions.

A general aim of the present invention is to provide advances with respect to testing mechanisms.

SUMMARY OF THE INVENTION

Embodiments of the invention pertain to methods and systems of testing an operating system. In one embodiment, the operating system is invoked to create a process, the process having a first thread. A test function is repetitively executed in the first thread of the process. These steps are repeated to create processes and to execute the test function in parallel and repetitively in the first thread of the created processes until a given condition is satisfied. For example, the given condition can be a condition in which the operating system resources are exhausted.

An embodiment of a framework for testing an operating system is also described. The framework works in relation with a test function. The framework includes a test launcher capable of invoking the operating system to create a process, the process having a first thread. The test launcher is also capable of repetitively executing the test function in the first thread of the process. The test launcher is further capable of repeatedly invoking the operating system to create processes and execute the test function, so that the test launcher executes the test function in parallel and repetitively in the first thread of the created processes until, for example, the operating system resources are exhausted.

These and other objects as well as advantages of the present invention will no doubt become obvious to those of ordinary skill in the art after having read the following detailed description of the preferred embodiments, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the various embodiments of the invention, examples of which are illustrated in the accompanying drawings.

As they may be cited in this specification, Sun, Sun Microsystems, Solaris, ChorusOS are trademarks of Sun Microsystems, Inc. SPARC is a trademark of SPARC International, Inc.

This patent application may contain material which is subject to copyright protection. The copyright owner has no objection to the facsimile reproduction by anyone of the patent document or the patent disclosure, as it appears in the Patent and Trademark Office patent file or records, but otherwise reserves all copyright and/or author's rights whatsoever.

Embodiments of the present invention encompass software code, especially when made available on any appropriate computer-readable medium. The expression "computer-readable medium" or "computer-usable medium" includes but is not limited to a storage medium such as magnetic or optic, as well as a transmission medium such as a digital or analog signal.

Figure 1:
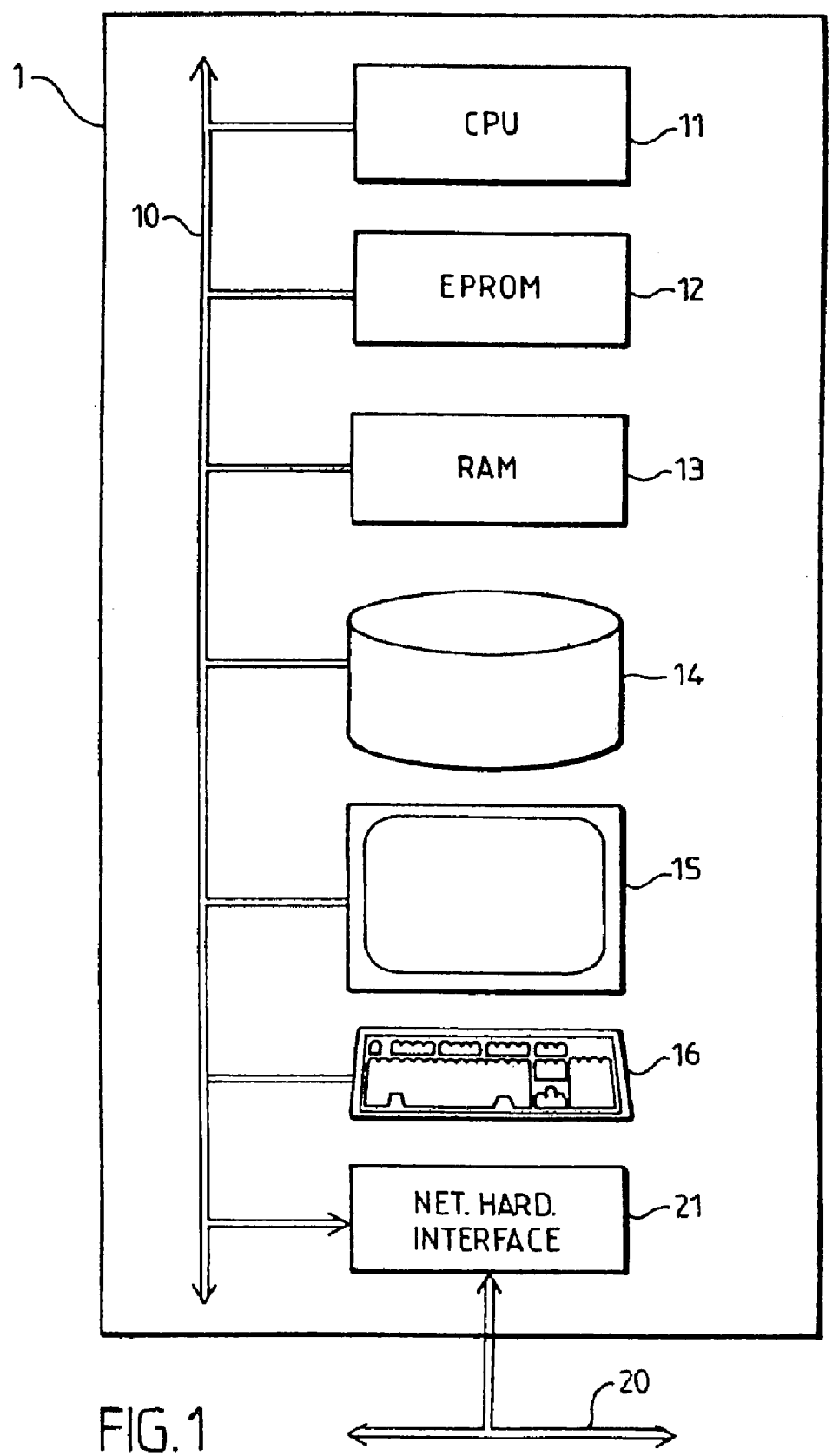
FIG. 1 is a block diagram of an exemplary computer system upon which embodiments of the present invention can be implemented.

FIG. 1 is a functional block diagram of an exemplary computer system 1 upon which embodiments of the present invention can be implemented. The exemplary computer system 1 includes a processor 11 (e.g., an Ultra-Sparc); a program memory 12 (e.g., an EPROM for BIOS, a RAM, or Flash memory, or any other suitable type of memory); a working memory 13 (e.g., a RAM of any suitable technology including SDRAM for example); a mass memory 14 (e.g., one or more hard disks); a display 15 (e.g., a monitor); a user input device 16 (e.g., a keyboard and/or mouse); and a network interface device 21 coupled to a communication medium 20, itself in communication with other computers. Network interface device 21 may be an Ethernet device, a serial line device, or an ATM device, inter alia. Medium 20 may be based on wire cables, fiber optics, or radio-communications, for example.

Data may be exchanged between the components of FIG. 1 through a bus system 10, schematically shown as a single bus for simplification of the drawing. As is known, bus systems may often include a processor bus, for example, of the PCI type, connected via appropriate bridges to, for example, an ISA bus and/or an SCSI bus.

Figure 2:
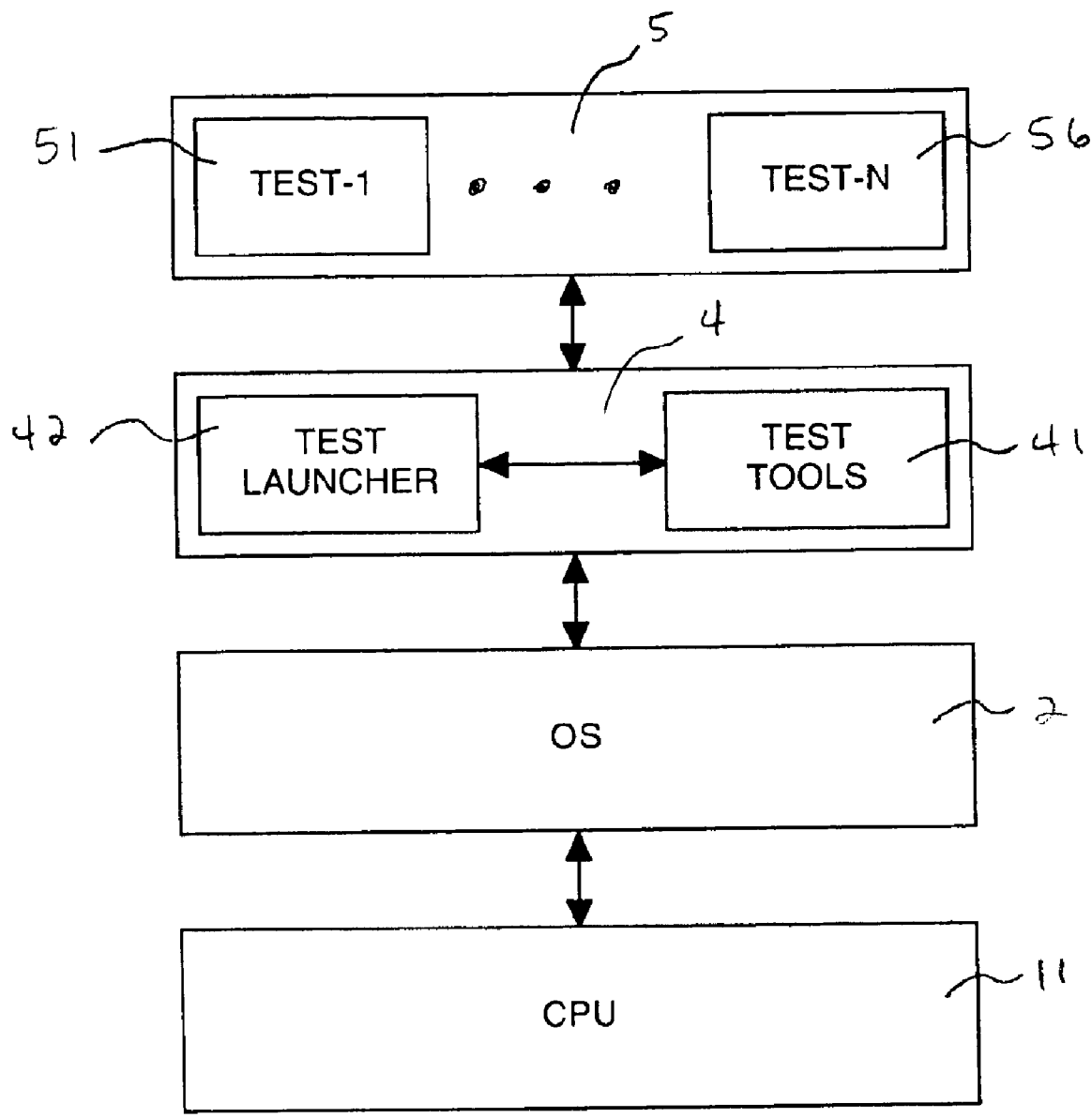
FIG. 2 is a data flow diagram showing a portion of FIG. 1 in more detail, and includes a test framework and a group of tests according to an embodiment of the present invention.

FIG. 2 is a data flow diagram showing a portion of FIG. 1 in more detail, and includes a test framework and a group of tests according to an embodiment of the present invention. A test, also called a test function, can be generally described as a program to test or to check the behavior of an operating system. The processor 11 is adapted to work with an operating system 2. In the present embodiment, to test this operating system, a test framework 4 works on the basis of a group of tests 5. The test framework 4 includes a generic environment to execute tests. The generic test environment for executing tests on an operating system may be, for example, the POSIX interface used on UNIX based systems, although the present invention is not so limited. The group of tests 5 includes a set of tests such as test-1 to test-N, referenced in FIG. 2 as 51 and 56. In the present embodiment, the test framework 4 includes a test launcher 42 and test tools 41. The test framework 4 may be a software framework.

Figure 3:
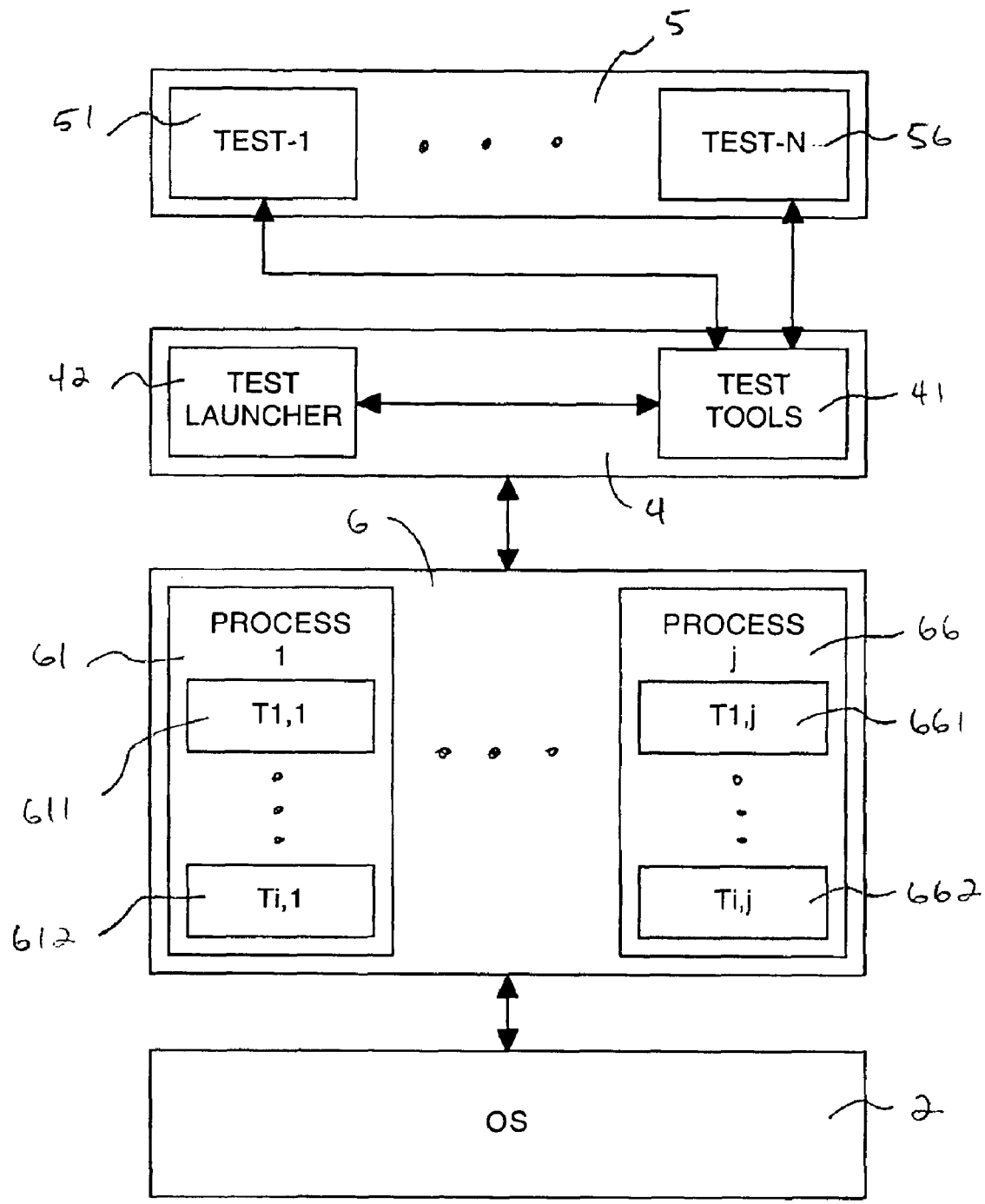
FIG. 3 is a data flow diagram showing a portion of FIG. 2 in more detail, and includes a set of active entities according to an embodiment of the present invention.

FIG. 3 is a data flow diagram showing a portion of FIG. 2 in more detail, and includes a set of active entities 6 (e.g., threads and processes) according to an embodiment of the present invention. In the present embodiment, the test launcher 42 invokes the operating system 2 to create the set of active entities 6 in memory (e.g., in RAM). The set of active entities 6 includes a set of processes such as process 1 to process j, referenced as 61 and 66 in FIG. 3. Each process 1 to j may be represented as a program instance. Each process includes one thread at its creation, which may be called a main thread. A thread may be represented as a program state instance. In the present embodiment, the test launcher 42 invokes the operating system 2 to create further threads in memory (e.g., in RAM) for each process. FIG. 3 illustrates process 1 having i threads $T_{1,1}$ to $T_{i,1}$, referenced as 611 and 612, and process j having i threads $T_{1,j}$ to $T_{i,j}$, referenced as 661 and 662.

Figure 4:
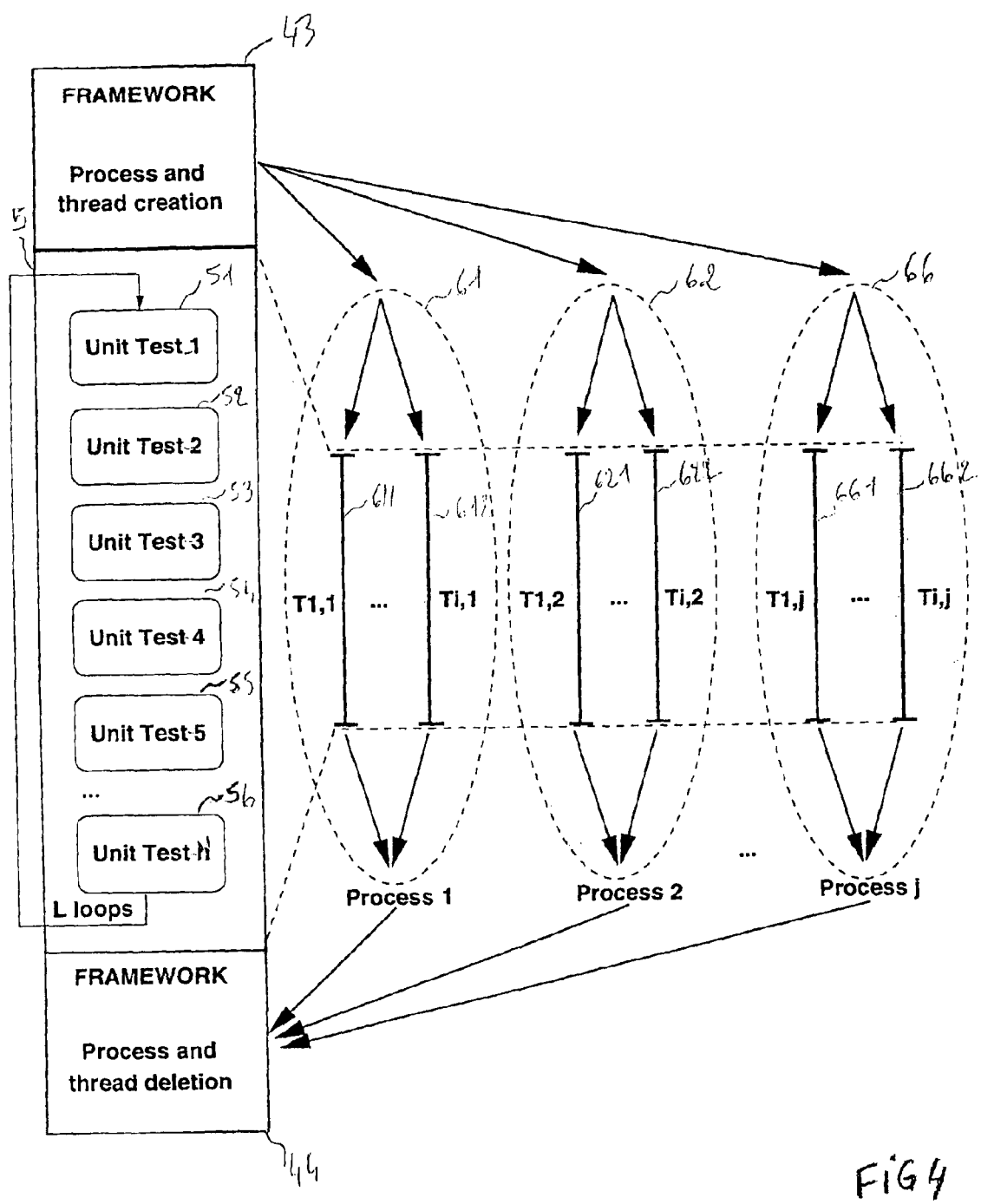
FIG. 4 is a data flow diagram showing a portion of FIG. 3 in more detail, and includes modules of the test framework according to an embodiment of the present invention.

FIG. 4 is a data flow diagram showing a portion of FIG. 3 in more detail, according to an embodiment of the present invention. In the present embodiment, the test launcher 42 of FIG. 3 includes a process and thread creation module 43. Responsive to parameters defining the number of processes and corresponding threads, the module 43 invokes the operating system 2 (FIG. 3) to create the processes 1, 2, ..., j referenced as 61, 62 and 66, and their corresponding threads $T_{1,1}$, ..., $T_{i,1}$; $T_{1,2}$, ..., $T_{i,2}$; and $T_{1,j}$, ..., $T_{i,j}$, referenced as 611, 612, 621, 622, 661 and 662.

The process and thread creation module 43 of FIG. 4 may also invoke the operating system 2 (FIG. 3) to create supplementary processes and/or threads on an invocation for an existing (e.g., previously created) process.

In the present embodiment, the test launcher 42 (FIG. 3) also includes a process and thread deletion module 44 (FIG. 4). Responsive to a deletion request coming from the main threads of each process, the process and thread deletion module 44 invokes the operating system to delete threads of corresponding processes. The process and thread deletion module 44 can also invoke deletion of a given process to the operating system.

With reference to FIG. 4, to test the operating system, for instance in stressing conditions, a number of processes and corresponding threads are created. Test-1, test-2, test-3, test-4, test-5, ..., and test-N, referenced as tests 51, 52, 53, 54, 55 and 56 in FIG. 4, are applied repetitively, e.g., during L loops, and in parallel in each process and in each thread of the processes. At a given instant, a first thread may not execute the same test as a second thread. In other words, at any instant, a different test may be executing in each thread. In a particular embodiment, the tests invoked by each thread may be chosen randomly from among the N tests.

Figure 5:
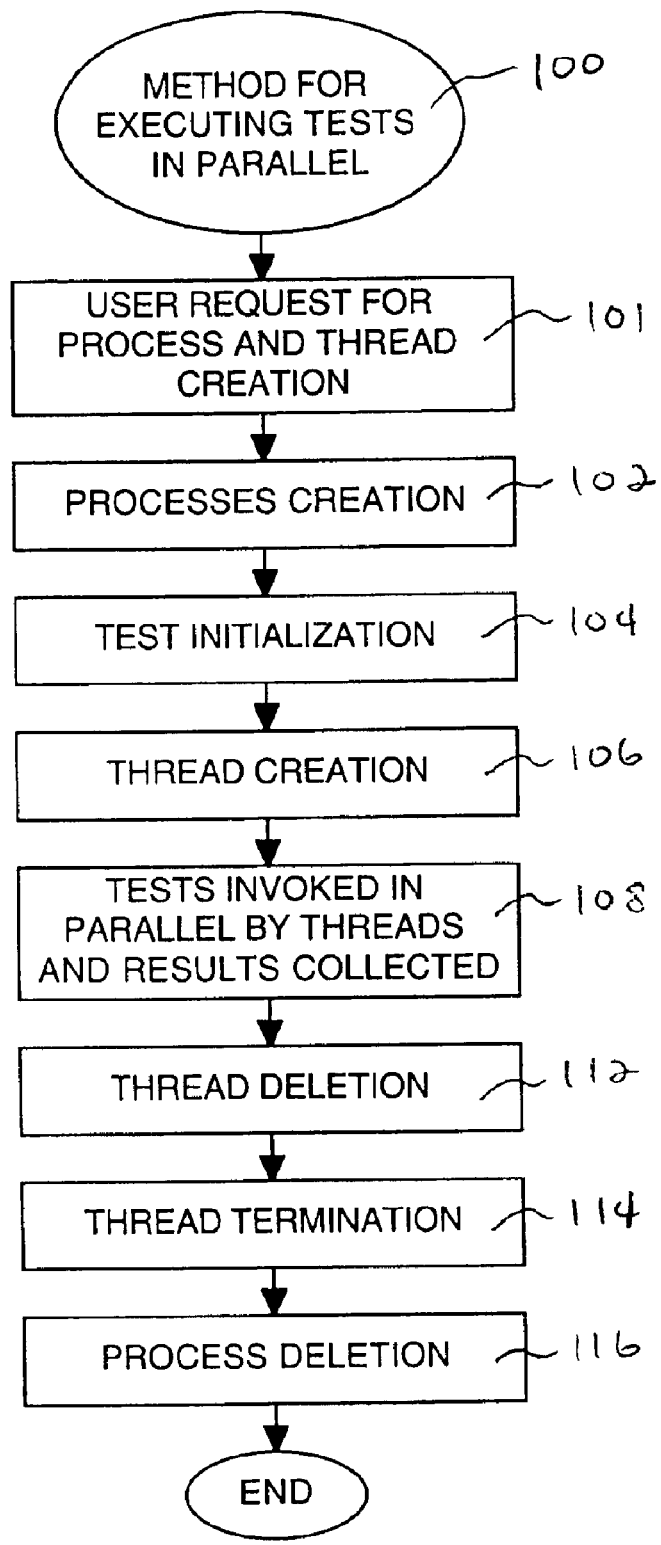
FIG. 5 is a flowchart of a process for executing tests in parallel according to an embodiment of the present invention.

FIG. 5 illustrates a method 100 for executing tests in parallel in different threads. At operation 101, a user who wishes to test the operating system chooses parameters and sends them to the test framework. These parameters can include the number of processes (j) to be created. These parameters can also include the number of threads (i) to be created. These parameters may be selected and stored in advance, e.g., in a configuration file.

At operation 102, the process and thread creation module 43 (FIG. 4) is invoked to first create the number of desired processes. To create the desired number of processes, the process and thread creation module 43 invokes the operating system. Each process is created with a main thread.

At operation 104 of FIG. 5, each main thread in each process can invoke a test initialization.

Then, at operation 106, if the creation of other threads is invoked at operation 101, the process and thread creation module 43 (FIG. 4) permits the creation of the desired number of threads in each process. The test tools module 41 (FIG. 3) includes tools to detect problems such as creation problems. For example, these tools can include the sending error messages.

At operation 108 of FIG. 5, depending on the number of processes and threads, the test launcher 42 (FIG. 3) manages the execution of tests through the following exemplary execution modes:

1) mono-thread (i=1) and mono-process mode (j=1): in this first mode, the tests are executed by a single thread in a single process;

2) multi-thread (i>1) and mono-process mode (j=1): in this second mode, the tests are executed in parallel by multiple threads in a single process;

3) mono-thread (i=1) and multi-process mode (j>1): in this third mode, the tests are executed in parallel by a single thread in multiple processes; and/or 4) multi-thread (i>1) and multi-process mode (j>1): in this fourth mode, the tests are executed in parallel by multiple threads in multiple processes.

The first of the above modes authorizes a repetitive sequential execution of a set of tests on a single thread of a single process. Even after prolonged execution using this first mode, a problem concerning the operating system, e.g., a missing resource, may not appear. Thus, to provide more complete and faster error detection, the other modes authorize a repetitive execution of a set of tests on each thread of each process, referred to as parallel execution.

In another embodiment, operations 101 to 108 of FIG. 5 can be applied for one process having at least one thread. Then, these operations can be repeated to create in parallel other processes having at least one thread. These creation operations can be applied to load the operating system until operating system resources are exhausted. At that point, the operating system would have no more resources to create other processes and/or threads. These creation operations can also be applied until a selected number of process and/or threads is reached.

In the foregoing description, a test may be divided into several actions referred to as portions of the test.

For an operating system, executing tests in parallel in different threads may mean executing tests or portions of tests sequentially in different threads according to thread priority and time-sharing. In a first execution example, portions of an identical test may be authorized to be executed in different threads alternatively and in parallel. In a second execution example, an identical test may be authorized to be executed entirely only in one thread before being executed in another thread.

In addition, the test launcher makes every thread of every process sequentially execute repetitively the different tests which are embedded in the group of tests. Tests can use primitives to be called and global variables to be read. The primitives and the global variables can be provided by the test tools module 41 (FIG. 3) to execute tests in parallel. For example, primitives may be used at the test level to check if allocated memory for tests has been released, or if files opened during execution of tests have been closed.

Tests may follow basic rules to be embedded into the test framework using, e.g., the POSIX interface. As an example, the list below describes some of these conditions:

a) Tests may be aware of their own execution in parallel, with execution realized in multiple active entities (threads/processes).

b) Condition a) implies that tests may assign unique names to all resources they dynamically create. For instance, to guarantee a unique name for a file corresponding to a given thread in a given process, the file name may be composed with the thread and process identifier, e.g., /foo__th__23__proc__67 for thread 23 and process 67. This rule may be included in the rules of the test tools module.

c) Condition a) also implies that data used by tests may be private, e.g., automatically allocated or dynamically allocated. To access global variables, mutual exclusion is utilized.

When launching a test program, three parameters may be provided to the test framework:

i, the number of processes;

j, the number of threads within each process; and

L, the number of times each thread of each process will execute the N different tests.

By providing appropriate values for these three parameters, a given set of tests can be used to heavily stress an operating system by having the tests executed with as much parallelism as desired or required.

In one embodiment, the user may choose the number j of processes to be created; the number i of threads to be created, which may be different for each process; and the number of loops L to apply tests to each thread of each process in parallel. In this embodiment, the operating system may be tested in normal conditions or in more stressing conditions according to the choice of the user. In another embodiment, the choice of the variables j, i and L may be automatically provided by the test launcher 42 (FIG. 3).

More generally, the load that can be exercised on an operating system with the same set of tests, may be seen as unlimited when using the parallel execution of tests in each thread of processes.

Returning to FIG. 5, at operation 112, each main thread of each process may delete the other threads of processes. Then, each main thread may invoke the test termination at operation 114. Each process may be deleted at operation 116.

Figure 6:
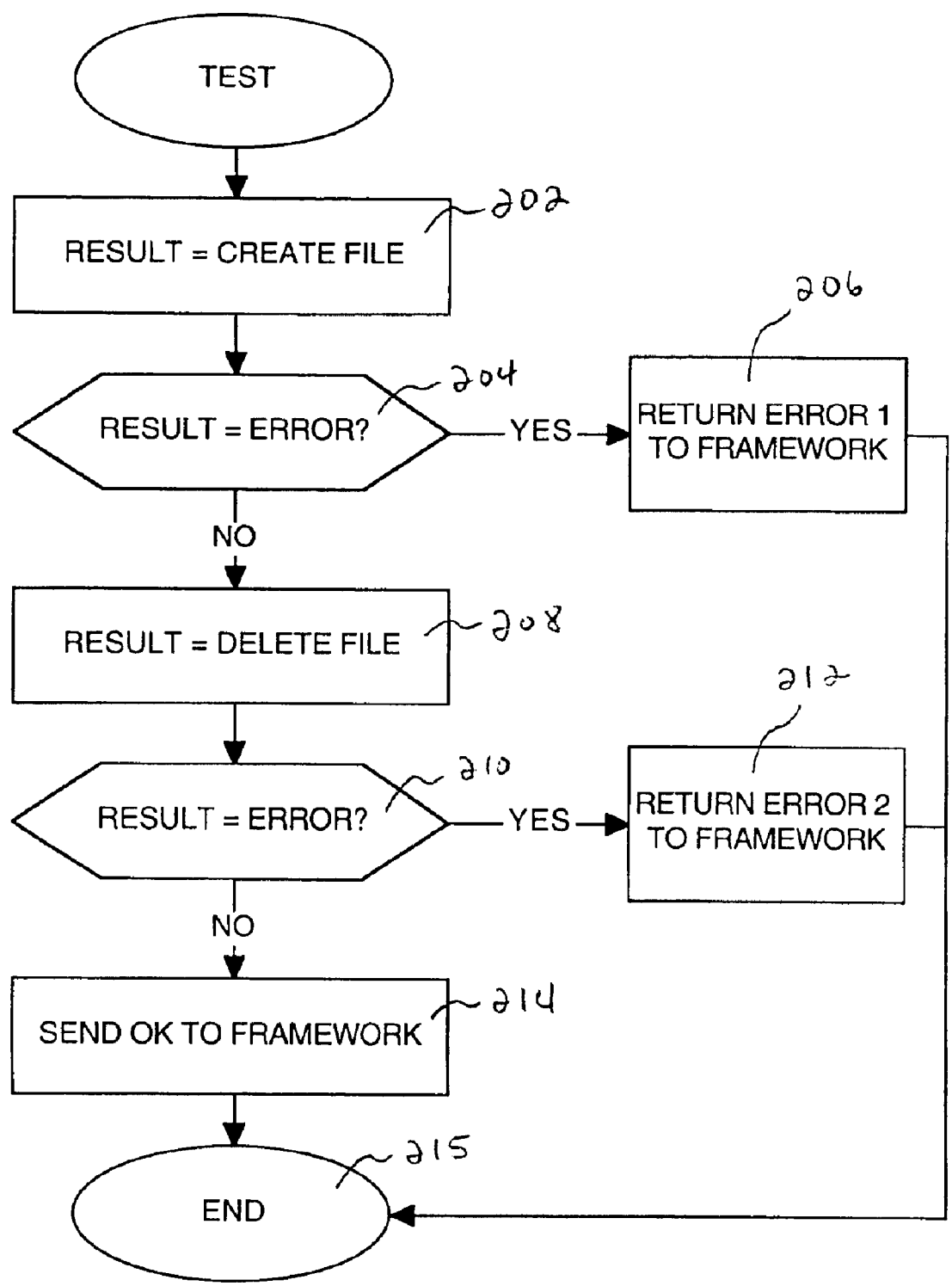
FIG. 6 is a flowchart for an example of a test applied to an operating system according to an embodiment of the present invention.

FIG. 6 illustrates an example of a test applied to an operating system according to an embodiment of the present invention. At operation 202, the specified result is to create a file, which may be done according to given rules in the test tools.

At operation 204, if the result obtained is not the one specified, an error referred to as error 1 is sent to the framework at operation 206 and the test ends at operation 215. Otherwise, the test continues at operation 208.

In operation 208, the specified result is to delete the created file. At operation 208, if the result obtained is not the one specified, an error referred to as error 2 is sent to the framework at operation 212 and the test ends at operation 215. Otherwise, a message "OK" is sent to the framework at operation 214 and the test ends at operation 215.

In the case of a message "OK," the test is successful for the operating system. In the other cases, e.g., in operation 206 or 212, the type of error may determine if the operating system has failed or if other problems appeared (e.g., a resource is missing).

The test framework which creates the set of active entities 6 (FIG. 3) may be included in a product such as a software package to test systems, e.g., operating systems.

Interfaces other than POSIX may be used to execute tests on other systems.

The structure comprising the test framework interacting with a group of tests and a set of active entities (e.g., threads and processes) may test an operating system working in relation with one or more processors. Moreover, this structure may test a database server working in relation with one or more processors. In another embodiment, this structure may test a Java virtual machine comprising threads working in relation with one or more processors.

Embodiments of the present invention have been described. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer-implemented method for testing an operating system, comprising:

(a) causing said operating system to create a process having at least a first thread and a second thread;

(b) causing two or more test functions to be executed in said first thread, wherein each test function of said two or more test functions is a different test function;

(c) causing said two or more test functions to be executed in said second thread; and (d) repeating steps (a), (b), and (c) to cause said operating system to create one or more additional processes each having at least two threads and to cause said two or more test functions to be executed in each of said at least two threads.

2. A method as recited in claim 1, wherein said two or more test functions are executed in parallel in each of said first thread, said second thread, and said at least two threads.

3. A method as recited in claim 1, wherein said two or more test functions are executed sequentially in each of said first thread, said second thread, and said at least two threads.

4. A method as recited in claim 1, wherein each test function of said two or more test functions is executed substantially simultaneously by each of said first thread, said second thread, and said at least two threads.

5. A method as recited in claim 1, wherein each test function of said two or more test functions is executed entirely in a particular thread before said each test function begins execution in another thread.

6. A method as recited in claim 1, wherein each test function of said two or more test functions is executed randomly in each of said first thread, said second thread, and said at least two threads.

7. A method as recited in claim 1, further comprising the computer-implemented step of:
repeating step (d) until a total number of processes created by said operating system is at least equal to a predetermined number of processes.

8. A method as recited in claim 1, further comprising the computer-implemented step of:
executing step (d) such that a total number of threads per process is at least equal to a predetermined number of threads per process.

9. A method as recited in claim 1, further comprising the computer-implemented step of:
executing step (d) such that a total number of times that each test function of said two or more test functions is executed by each thread is at least equal to a predetermined number of times.

10. A method as recited in claim 1, further comprising the computer-implemented step of:
repeating step (d) until a plurality of resources available to said operating system are exhausted.

11. A computer-readable medium for testing an operating system, the computer-readable medium carrying instructions which, when executed by one or more processors, cause performance of the steps of:
(a) causing said operating system to create a process having at least a first thread and a second thread;
(b) causing two or more test functions to be executed in said first thread, wherein each test function of said two or more test functions is a different test function;
(c) causing said two or more test functions to be executed in said second thread; and
(d) repeating steps (a), (b), and (c) to cause said operating system to create one or more additional processes each having at least two threads and to cause said two or more test functions to be executed in each of said at least two threads.

12. A computer-readable medium as recited in claim 11, wherein said two or more test functions are executed in parallel in each of said first thread, said second thread, and said at least two threads.

13. A computer-readable medium as recited in claim 11, wherein said two or more test functions are executed sequentially in each of said first thread, said second thread, and said at least two threads.

14. A computer-readable medium as recited in claim 11, wherein each test function of said two or more test functions is executed substantially simultaneously by each of said first thread, said second thread, and said at least two threads.

15. A computer-readable medium as recited in claim 11, wherein each test function of said two or more test functions is executed entirely in a particular thread before said each test function begins execution in another thread.

16. A computer-readable medium as recited in claim 11, wherein each test function of said two or more test functions is executed randomly in each of said first thread, said second thread, and said at least two threads.

17. A computer-readable medium as recited in claim 11, further comprising instructions which, when executed by the one or more processors, cause performance of the step of:
repeating step (d) until a total number of processes created by said operating system is at least equal to a predetermined number of processes.

18. A computer-readable medium as recited in claim 11, further comprising instructions which, when executed by the one or more processors, cause performance of the step of:
executing step (d) such that a total number of threads per process is at least equal to a predetermined number of threads per process.

19. A computer-readable medium as recited in claim 11, further comprising instructions which, when executed by the one or more processors, cause performance of the step of:
executing step (d) such that a total number of times that each test function of said two or more test functions is executed by each thread is at least equal to a predetermined number of times.

20. A computer-readable medium as recited in claim 11, further comprising instructions which, when executed by the one or more processors, cause performance of the step of:
repeating step (d) until a plurality of resources available to said operating system are exhausted.

21. A mechanism for testing an operating system, the mechanism comprising a memory storing instructions which, when executed by one or more processors, cause performance of the steps of:
(a) causing said operating system to create a process having at least a first thread and a second thread;
(b) causing two or more test functions to be executed in said first thread, wherein each test function of said two or more test functions is a different test function;
(c) causing said two or more test functions to be executed in said second thread; and
(d) repeating steps (a), (b), and (c) to cause said operating system to create one or more additional processes each having at least two threads and to cause said two or more test functions to be executed in each of said at least two threads.

22. A mechanism as recited in claim 21, wherein said two or more test functions are executed in parallel in each of said first thread, said second thread, and said at least two threads.

23. A mechanism as recited in claim 21, wherein said two or more test functions are executed sequentially in each of said first thread, said second thread, and said at least two threads.

24. A mechanism as recited in claim 21, wherein each test function of said two or more test functions is executed substantially simultaneously by each of said first thread, said second thread, and said at least two threads.

25. A mechanism as recited in claim 21, wherein each test function of said two or more test functions is executed entirely in a particular thread before said each test function begins execution in another thread.

26. A mechanism as recited in claim 21, wherein each test function of said two or more test functions is executed randomly in each of said first thread, said second thread, and said at least two threads.

27. A mechanism as recited in claim 21, wherein the memory further comprises one or more instructions which, when executed by the one or more processors, cause performance of the step of:
repeating step (d) until a total number of processes created by said operating system is at least equal to a predetermined number of processes.

28. A mechanism as recited in claim 21, wherein the memory further comprises one or more instructions which, when executed by the one or more processors, cause performance of the step of:

executing step (d) such that a total number of threads per process is at least equal to a predetermined number of threads per process.

29. A mechanism as recited in claim 21, wherein the memory further comprises one or more instructions which, when executed by the one or more processors, cause performance of the step of:

executing step (d) such that a total number of times that each test function of said two or more test functions is executed by each thread is at least equal to a predetermined number of times.

30. A mechanism as recited in claim 21, wherein the memory further comprises one or more instructions which, when executed by the one or more processors, cause performance of the step of:

repeating step (d) until a plurality of resources available to said operating system are exhausted.

* * * * *